United States Patent
Washburn

[11] 3,800,881
[45] Apr. 2, 1974

[54] KNIFE COULTER FOR PLOW
[76] Inventor: Selden G. Washburn, Rural Route, Goodwin, S. Dak. 57238
[22] Filed: Nov. 21, 1972
[21] Appl. No.: 308,543

[52] U.S. Cl.................. 172/165, 172/710, 172/515
[51] Int. Cl....................... A01b 15/18, A01b 39/22
[58] Field of Search ........................... 172/165–166, 172/705, 710, 265, 139, 144, 515, 510, 773–776; 16/190–191; 83/433

[56] References Cited
UNITED STATES PATENTS

| 1,937,428 | 11/1933 | Keefe | 172/710 |
| 1,220,071 | 3/1917 | Clayton | 172/510 |
| 941,298 | 11/1909 | Baxter | 172/515 |
| 253,395 | 2/1882 | Kennedy | 172/515 |
| 1,126,402 | 1/1915 | Combs | 172/165 |
| 381,529 | 4/1988 | Carpenter | 172/165 |
| 2,496,481 | 2/1950 | Lyle | 172/166 |
| 3,650,557 | 3/1972 | Dudley | 16/191 X |

FOREIGN PATENTS OR APPLICATIONS

| 708,660 | 7/1931 | France | 172/165 |

Primary Examiner—Robert E. Pulfrey
Assistant Examiner—Steven A. Bratlie
Attorney, Agent, or Firm—Clarence A. O'Brien; Harvey B. Jacobson

[57] ABSTRACT

An elongated blade-type coulter with a keen knife edge is pivotally mounted on a plow beam in front of and is oriented in alignment with an earth plowing and turning moldboard and is used in lieu of the commonly employed trash cutting disk-type rolling coulter. Experimental field tested use of this improved knife coulter has repeatedly shown that it functions excellently and well serves the purposes for which it has been adopted and used. Unlike the rolling disk-type coulter it has no hub means which, as is known, commonly accumulates and is fouled with weeds, straw and trash. It is pivotally bracketed on the beam, is spring-biased and rides with clearance above the bottom of the furrow. It yields upwardly and travels free and safely over embedded rocks and stones. Then, too, it functions properly even when the equipment is operated in reverse.

4 Claims, 3 Drawing Figures

KNIFE COULTER FOR PLOW

This invention relates to an improved coulter and has to do, more particularly, with a knife coulter which is designed and adapted to be pivotally mounted on a plow beam forwardly of and in alignment with the curved face of the customary moldboard and which lends itself to use in lieu of the commonly used disk-type rolling coulter.

A significant object of the herein disclosed invention is to substitute a knife coulter for a disk-type rolling coulter and to facilitate plowing flax stubble fields and, in so doing, to better cope with the overall plowing problem.

For background purposes it can be pointed out at the outset that appropriately constructed accessories and implements are deemed to be necessary when undertaking an acceptably satisfactory plowing job. For example, a disk-type rolling coulter is virtually essential in that the cutting edge functions to cut through tough soil, weeds, certain roots and dificult-to-cope-with trash and debris. On the other hand and when plowing flax stubble fields and the like straw and weeds wind around, plug up and objectionably clog the hub means. By adopting a pivoted spring-biased blade or knife of the construction herein shown and described the problem has now been satisfactorily and acceptably solved.

Briefly and from the overall combination the concept pertains to a plow embodying, as is usual, a horizontal beam and means carried by the trailing end portion of the beam suspending and carrying an earth plowing and turning moldboard. Coulter means complemental to and oriented with a coacting face of the moldboard is provided and, more specifically, is characterized by an elongated blade having a surface and trash cutting edge and is positioned and adapted to operate in front of and in aligned conjunction with the moldboard. Adapter means is supported from the beam in a functioning position ahead of the concave face of the moldboard and suspending means therefor. Spring-biased and blade mounting means is provided for pivotally mounting the blade on the adapter means and, in so doing, permitting said blade to swing yieldingly in a vertical plane on a horizontal pivotal axis.

In carrying out a preferred embodiment of the invention the adapter means is characterized by a bracket which is mounted on the beam. The blade mounting means comprises a holder, the blade embodying a shank and said shank being superimposed and clampingly mounted on a part of the holder in a manner that the holder is pivotally associated with the adapter bracket.

In carrying out a preferred embodiment of the invention the holder is substantially L-shaped in elevation and embodies a long leg defining that part on which the shank is superimposed and clamped in place. It also embodies a short leg and the short leg projects upwardly toward the beam and bracket and provides an abutment which is cooperable with a manually adjustable limit stop member.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
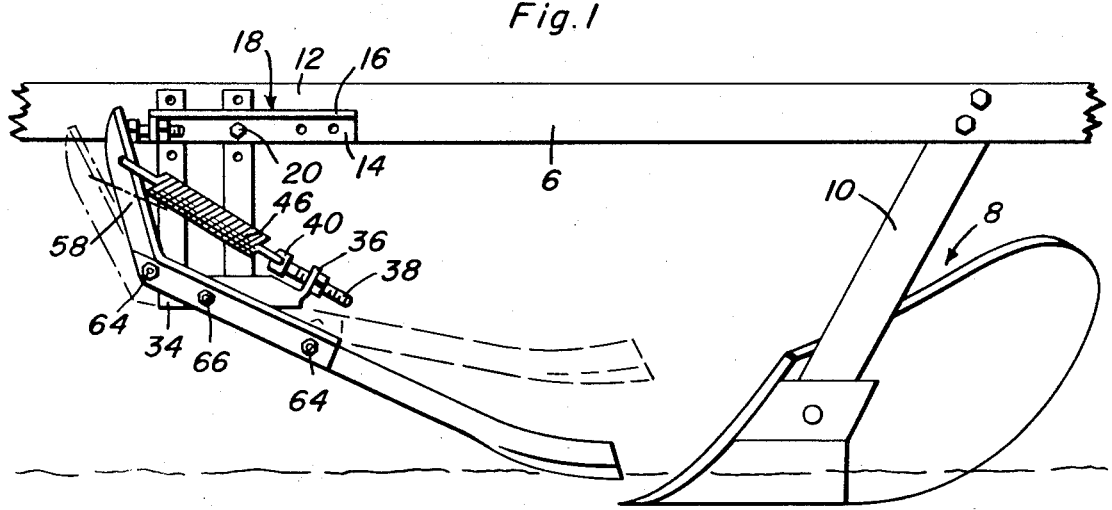
FIG. 1 is a view in side elevation showing a fragmentary portion of a plow beam, showing the fixed depending conventional type moldboard and showing, what is more significant, the knife coulter and how it is constructed and mounted on the beam.

With reference now to FIG. 1 the usual horizontal plow beam is denoted by the numeral 6 and the aforementioned plowing and turning moldboard is denoted by the numeral 8, said moldboard being supported on the lower end portion of a suitably angled support member 10.

Figure 2:
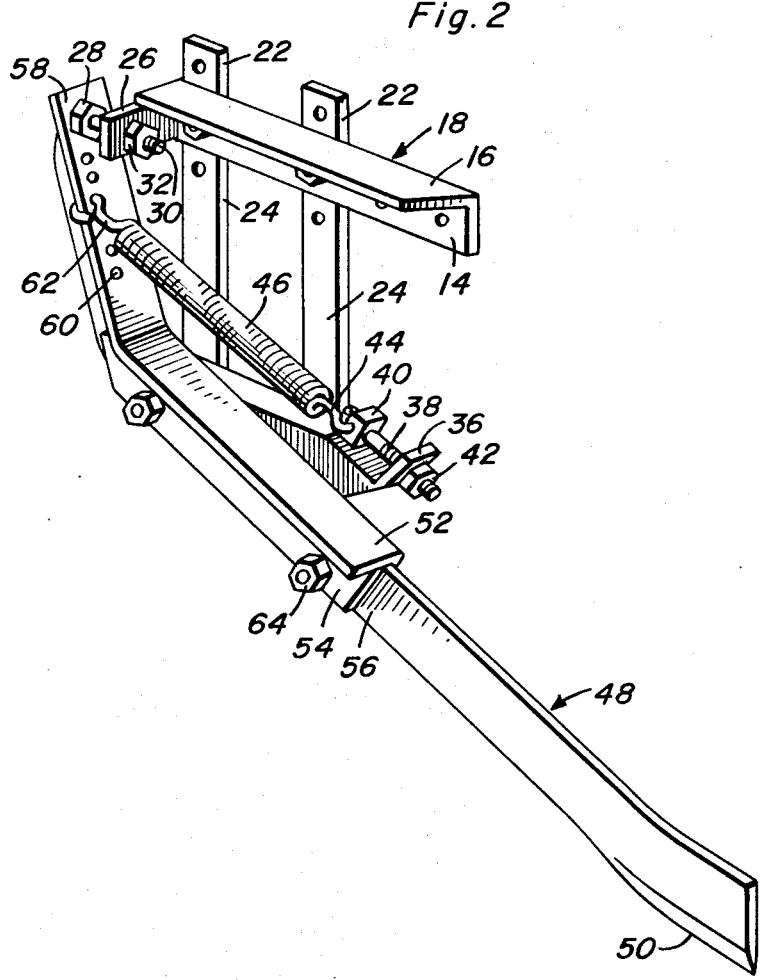
FIG. 2 is a view in perspective of the knife coulter detached from the beam.
Figure 3:
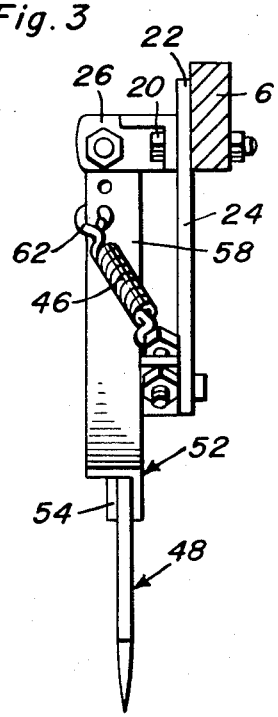
FIG. 3 is an end view observing the structure in a direction from right to left.

The aforementioned adapter bracket is designed and adapted to be mounted on a side surface portion 12 of the aforementioned beam. To the ends desired this adapter bracket preferably comprises an appropriate length of angle iron herein differentiated as a first angle iron and comprising a vertical flange 14 and a horizontal flange 16. The bracket as a unit is denoted by the numeral 18. As brought out in FIG. 1 the vertical flange is bolted or otherwise secured as at 20 on the beam in the manner illustrated. The bolts or other equivalent fasteners which are employed for this purpose also serve to position and retain the upper end portions 22 of a pair of duplicate hanger arms 24. Reverting to the adapter bracket it will be evident that the left hand end in FIG. 2 is provided with a component lateral extension 26 which supports manually adjustable limit stop means, more particularly, a bolt having a head 28 and a threaded stem 30 passing through the extension and held in operative position by an assembling and adjusting nut 32. The extension 26 may be provided with a screw-threaded hole (not detailed) to permit the desired adjustment to be attained and to permit the bolt head to serve as the desired stop.

A substantially channel-shaped horizontally disposed clip or cleat is provided at 34 and constitutes an appropriate anchoring member. In actual practice this cleat bridges the lower end portions of the hanger arms 24 and is integrally connected thereto in any suitable manner. One end portion of the cleat projects beyond the adjacent angle arm and is provided with an upstanding lug 36 having a screw-threaded hole to accommodate the threaded shank 38 of an anchoring and adjusting bolt 40. Hereagain the shank is threaded through a hole provided therefor in the lug and a retaining nut 42 is provided to achieve the desired retaining result. A lower end portion 44 of a suitably coiled and tensioned spring 46 is connected with the adjusting head 40.

With respect now to the coulter means it is pivotally mounted and spring-biased to achieve the desired positioning and pivoting result necessary. More specifically this means comprises an elongated blade 48 having a suitably shaped cutting edge 50 which in practice is cooperable with the concave side of the moldboard 8. The shank portion is clamped in a holder provided therefor. The holder is preferably L-shaped in side elevation and comprises a simple angle iron the long leg of which is denoted at 52. This leg serves to accommodate a clamping plate 54 which is clamped against the shank 56 of the blade and permits the blade to be removed for replacement or sharpening as the case may be. This holder as stated takes the form of an angle iron and the short leg thereof is denoted at 58 and is oblique-angled so that the upper end portion is aligned and cooperable with the limit stop bolt or screw 28. In fact, this end portion is provided with holes 60 properly arranged to accommodate the attachable end portion 62 of the aforementioned coil spring 46.

The fastening means for the clamping plate 54 may vary in construction. Ordinarily, however, each means comprises a simple bolt and nut denoted at 64. The intermediate headed bolt 66 provides a mounting and pivotal connection between the blade-equipped holder and the aforementioned cleat or clip 54. This is to say the median portion of the long leg 52 is superimposed upon a surface of the clip and is pivotally bolted thereto in a manner to permit the thus mounted spring-biased knife to perform in the manner shown in full and dotted lines in FIG. 1.

The essence of the overall concept has to do with an appropriate elongated blade 48 having a cutting knife at one end and a shank at the other end, the shank being detachably clamped on a holder and the holder being detachably and pivotally mounted on hanger means. More specifically the hanger means comprises the aforementioned angle-type adapter bracket 18, the complemental depending hanger arms 24 and the attached clip or cleat 34 providing a satisfactory mount for the holder and also providing a satisfactory anchor for the adjustably attached coil spring.

The herein disclosed knife coulter has been repeatedly field tested and, as constructed and shown, has been found to be satisfactorily and acceptably workable. A significant advantage of the instant invention over the aforementioned disk-type rolling coulter is that it does not become clogged with straw, weeds and debris as is the case with hub mounted rolling coulters. Experience has shown that the desired result is particularly true when plowing flax stubble fields. The spring-biased knife will rise and fall to minimize the likelihood of damage or breakage from embedded stones and rocks. Experience has also shown that the operator of the tractor and plow can place the equipment in reverse for the reason that the knife coulter will maintain the desired clearance above and over the bottom of the furrow. Ordinarily two simple bolts will serve to mount the adapter bracket and associated component parts on the plow beam.

It is believed that a careful consideration of the several views of the drawing will enable the reader to obtain a clear and comprehensive understanding of the individual parts, the manner in which they are constructed and perform. Accordingly a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A knife-type coulter attachment for the beam of a plow comprising: a first angle iron constituting an adapter bracket and designed and adapted to be mounted on a supporting surface of said beam, a pair of coplanar companion hanger arms having upper ends secured to said adapter bracket, the lower ends of said arms depending a predetermined distance below the level of said adapter bracket, an anchoring clip secured to said lower ends, a horizontally elongated coulter blade having a rearward end provided with a knife-edge and a forward end constituting a shank, a blade holder pivotally mounted on said anchoring clip, means clamping and mounting said shank on a component part of said holder, and a coil spring having a rearward end operatively secured to said anchoring clip and a forward end operatively connected to said holder, said holder comprising a second angle iron which is L-shaped in side elevation and embodies a long leg and a complemental short leg, said long leg constituting the aforementioned component part and on which said shank is disposed and clamped in a given position, said short leg projecting upwardly, the forward end of said coil spring being adjustably and detachably secured on said short leg, said anchoring clip being provided with an upstanding terminal lug equipped with an adjustable bolt with which a coacting forward end of said coil spring is cooperatively connected.

2. The coulter attachment defined in and according to claim 1, and wherein said adapter bracket is provided with an extension having a manually adjustable limit stop bolt with which an upper end of said short leg is aligned and cooperatively engageable.

3. A knife-type coulter attachment for the beam of a plow comprising, a first horizontally elongated angle iron constituting an adapter bracket and designed and adapted to be positioned lengthwise against and removably bolted on a vertical supporting surface of said beam, a pair of spaced parallel coplanar companion hanger arms having spaced upper ends detachably secured to an end portion of said adapter bracket, said arms having lower ends depending a predetermined distance below the level of said adapter bracket, a dual purpose anchoring clip spaced below said adapter bracket and bridging and secured to said lower ends, a horizontally elongated coulter blade having a rearward end provided with a knife-edge and a forward end constituting a shank, an elongated L-shaped angle iron constituting a blade holder, said blade holder embodying a long leg and a short leg, said short leg projecting upwardly toward and adjacent said adapter bracket, said adapter bracket including a forward end having a laterally projecting and outstanding extension, said extension being provided with a readily accessible and manually adjustble limit stop bolt aligned and cooperatively engageable with a coacting end of said short leg, said long leg having a forward end pivotally mounted on a cooperating forward end portion of said anchoring clip, clamping and mounting means cooperable with said shank and said long leg and removably securing said shank in a given position, said anchoring clip being provided at a rearward end with an upstanding terminal lug, and a coil spring having a forward end detachably and adjustably connected with a median portion of said short leg and a rearward end operatively cooperable with said lug.

4. The knife-type coulter attachment defined in claim 3 and wherein said lug has an adjustably mounted bolt, the rearward end portion of said spring being adjacent to and operatively connected with a coacting forward end portion of said bolt.

* * * * *